No. 657,723. Patented Sept. 11, 1900.
H. C. ARMITAGE.
STOVEPIPE ATTACHMENT.
(Application filed May 31, 1900.)
(No Model.)
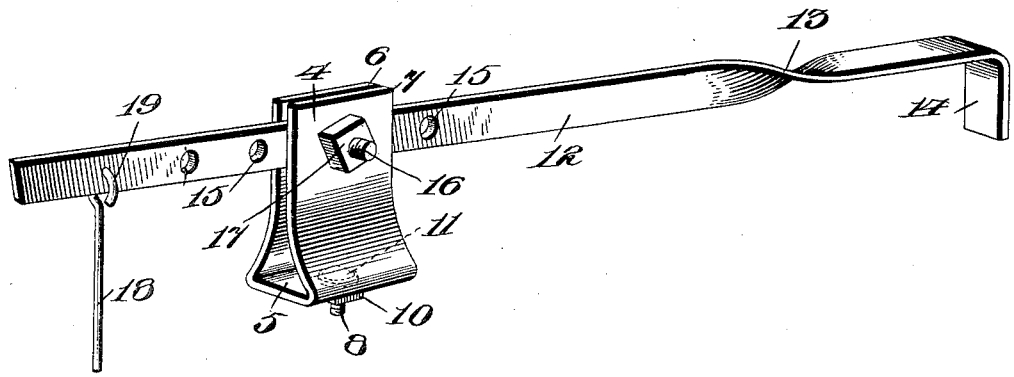
Witnesses
Geo. H. Byrne.
Louis G. Juliha
Homer C. Armitage.
Inventor
By C. G. Siggers
Attorney
THE NORRIS PETERS CO., PHOTO-LITHO., WASHINGTON, D. C.

UNITED STATES PATENT OFFICE.

HOMER C. ARMITAGE, OF KENESAW, NEBRASKA, ASSIGNOR OF ONE-HALF TO ALBERT A. ARMITAGE, OF SAME PLACE.

STOVEPIPE ATTACHMENT.

SPECIFICATION forming part of Letters Patent No. 657,723, dated September 11, 1900.

Application filed May 31, 1900. Serial No. 18,605. (No model.)

*To all whom it may concern:*

Be it known that I, HOMER C. ARMITAGE, a citizen of the United States, residing at Kenesaw, county of Adams, State of Nebraska, have invented a new and useful Stovepipe Attachment, of which the following is a specification.

My present invention relates to a certain new and useful attachment for stovepipes, the object in view being to provide a simple and readily-adjustable locking device by means of which a pipe-thimble or section of pipe may be securely retained in a chimney, but in a manner to permit of its ready removal when desired.

To the accomplishment of this end the invention consists in pivotally mounting a locking-lever upon the interior of a pipe-section, with one end bent to form a hook for engagement with the interior face of the chimney and with its opposite end provided with an actuating rod or handle passing through the wall of the stovepipe and designed to be pushed or pulled, as the case may be, to rock the locking-lever, and thereby effect the engagement of the latter with the wall of the chimney to lock the stovepipe in place or to effect the disconnection of the hooked end of the lever from the chimney to permit the withdrawal of the pipe, all as will hereinafter more fully appear by reference to the accompanying drawings, in which I have illustrated the preferred embodiment of the invention.

In said drawings, Figure 1 is a sectional view through a portion of a chimney and the inner end of a stovepipe section or thimble retained in the pipe-opening of the chimney by my locking device, which is shown in elevation; and Fig. 2 is a detail perspective view of the attachment removed from the pipe.

Referring to the numerals of reference employed to designate corresponding parts in both views, 1 indicates a chimney, and 2 the usual transverse opening through one wall thereof for the reception of the inner end of a stovepipe section or thimble 3. Ordinarily considerable difficulty is encountered in keeping the end of the stovepipe within the opening 2, particularly where several sections of the pipe are located intermediate of the stove and chimney. I have devised the attachment illustrated in order that it will constitute means for limiting the extent of insertion of the stovepipe into the opening and means for detachably locking or retaining the end of the pipe within the opening after it has been inserted. At a suitable distance from the inner end of the pipe 3, the distance corresponding to the extent of pipe which it is desired to pass into the opening 2, I provide a bearing-bracket 4, formed from a light metal plate bent to form a base-plate 5 and a pair of upstanding parallel bearing-plates 6 and 7. The bracket is secured upon the interior of the pipe 3, with the base-plate in contact with the interior of the latter, by means of a short bolt 8, passed through the base-plate 5 and through an opening 9 in the wall of the pipe 3, upon the exterior of which latter the bolt is provided with a nut 10, which upon being screwed up draws the head 11 of the bolt 8 toward the nut to clamp the base-plate 5 of the bearing-bracket securely against the wall of the pipe. As the nut 10 is located exterior to the stovepipe, it constitutes means for limiting the insertion of the end of the pipe into the chimney-opening 2 and serves to coöperate with the locking-lever 12 to rigidly retain the pipe in the opening. The locking-lever 12 is a flat strip of metal twisted adjacent to one end, as indicated at 13, and having its extremity bent at an angle to form a hook 14, designed when in use to engage the inner face of the chimney, as shown in Fig. 1 of the drawings. Adjacent to its rear extremity—that is to say, at the end opposite the hook 14—the locking-lever 12 is provided with a longitudinal series of transverse openings 15, through either one of which, according to the thickness of the chimney-wall 1, is passed a fulcrum-bolt 16, piercing the bearing-plates 6 and 7 transversely adjacent to the upper end of the bracket and retained, as by a nut 17. Contiguous to the extremity of the lever 12, opposite the hook 14, said lever is provided with a handle 18, which may be and preferably is a short piece of wire having a hook 19 at its inner end engaging an aperture in the lever 12 and extending through an opening 20 in the wall of the stovepipe to cause one end of the handle to project beyond the stovepipe for the purpose of facilitating the rocking of the lever to effect its attachment to or detachment from the chimney when it is desired to lock the stovepipe in place or to secure its removal.

It will be observed that the hooked end of the locking-lever is somewhat more extensive than the end which projects to the opposite side of the fulcrum and that therefore said end will normally gravitate into engagement with the chimney, it being simply necessary under ordinary conditions to insert the end of the stovepipe and force it to place, the hook 14 effecting an engagement with the wall of the chimney without special attention. It will be noted, however, that if desired the nut 17 may be screwed upon the bolt 16 with sufficient force to cause the bearing-plates 6 and 7 to bind against the opposite sides of the locking-lever 12 for the purpose of rigidly retaining the latter in its locked position. Under ordinary circumstances, on the contrary, the lever is mounted to have free movement in order that it may be easily engaged or disengaged by a slight push or pull upon the extended end of the handle 18.

From the foregoing it will be observed that I have produced a simple, ingenious, and inexpensive attachment by means of which a stovepipe section or thimble may be detachably retained within a chimney of any size, inasmuch as the distance between the hook 14 and the nut 9 may be adjusted by passing the bolt 16 through either of the openings 15 in the lever; but while the present embodiment of my invention appears at this time to be preferable I do not wish to limit myself to the structural details defined, but reserve the right to effect such changes, modifications, and variations as may come properly within the scope of the protection prayed.

What I claim is—

1. The combination with a stovepipe extension, of a bracket extending inwardly from the wall thereof, an operating-lever fulcrumed in the bracket and having a hooked end extended beyond the pipe, and an operating-handle piercing the wall of the pipe-section and connected to the end of the lever opposite the hook.

2. The combination with a stovepipe or thimble, of a bearing-bracket therein, a bolt piercing the wall of the stovepipe and constituting means for retaining the bracket and for limiting the insertion of the pipe, a locking-lever fulcrumed in the bearing-bracket and provided with a hooked end extended beyond the end of the stovepipe or thimble, and a handle connected to the inner end of the lever and extended through the wall of the pipe.

3. The combination with a stovepipe or thimble, of a bearing-bracket therein comprising a base-plate and a pair of parallel bearing-flanges, means for securing the bearing-bracket in place, a fulcrum-bolt piercing the flanges, a locking-lever provided with a series of openings for engagement with the fulcrum-bolt, a nut upon the fulcrum-bolt for compressing the bearing-flanges against the opposite sides of the lever to retain it in place, said lever being provided with a hook at one end and with a loosely-connected handle at its opposite end, said handle being extended through the wall of the pipe.

In testimony that I claim the foregoing as my own I have hereto affixed my signature in the presence of two witnesses.

HOMER C. ARMITAGE.

Witnesses:
 LOUIS VEYETTE,
 B. F. ARMITAGE.